United States Patent
Porzi et al.

(10) Patent No.: US 8,842,028 B2
(45) Date of Patent: Sep. 23, 2014

(54) OPTICAL DIGITAL-TO-ANALOG CONVERSTION

(75) Inventors: Claudio Porzi, Civitavecchia (IT); Antonella Bogoni, Mantova (IT); Luca Poti, Pisa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 148 days.

(21) Appl. No.: 13/201,693

(22) PCT Filed: Feb. 16, 2009

(86) PCT No.: PCT/EP2009/051815
§ 371 (c)(1),
(2), (4) Date: Oct. 24, 2011

(87) PCT Pub. No.: WO2010/091740
PCT Pub. Date: Aug. 19, 2010

(65) Prior Publication Data
US 2012/0032827 A1    Feb. 9, 2012

(51) Int. Cl.
*H03M 1/00*      (2006.01)
*G02F 7/00*      (2006.01)
*G02F 1/35*      (2006.01)

(52) U.S. Cl.
CPC .............. *G02F 7/00* (2013.01); *G02F 2203/70* (2013.01); *G02F 1/3515* (2013.01)
USPC .......................................... 341/137; 341/144

(58) Field of Classification Search
CPC ....................................................... G02F 7/00
USPC .............. 341/137, 144; 359/245, 114; 398/79
See application file for complete search history.

(56) References Cited

U.S. PATENT DOCUMENTS

| | | | |
|---|---|---|---|
| 4,568,911 A * | 2/1986 | Yamashita et al. ............. | 341/137 |
| 5,451,776 A * | 9/1995 | Kolloff et al. ............. | 250/231.18 |
| 6,429,858 B1 * | 8/2002 | Janssen et al. ................ | 345/204 |
| 6,781,537 B1 * | 8/2004 | Taraschuk et al. ............ | 341/144 |
| 7,403,711 B2 * | 7/2008 | Chen et al. ....................... | 398/45 |
| 7,525,461 B1 * | 4/2009 | Uhlhorn ....................... | 341/137 |
| 7,564,390 B2 * | 7/2009 | Frazier et al. ................. | 341/144 |
| 2007/0116461 A1 | 5/2007 | Chen et al. | |
| 2008/0018513 A1 | 1/2008 | Frazier et al. | |

OTHER PUBLICATIONS

Chinese Search Report mailed Apr. 13, 2013 in Chinese Application 200980157213.2.

(Continued)

*Primary Examiner* — Brian Young
(74) *Attorney, Agent, or Firm* — Nixon & Vanderhye, P.C.

(57) ABSTRACT

The present invention relates to Digital-to-Analog conversion in the optical or photonic domain. The present invention provides a digital-to-analog converter (DAC) (100) arranged to receive an N-bit digital optical signal (105) and to process the N-bit digital optical signal to generate an analog optical signal (110). The DAC comprises a photonic circuit (120a, 120b) arranged to adjust the amplitude of each bit of the N-bit digital optical signal dependent on the amplitudes of at least one of the other bits of the N-bit digital optical signal. The amplitudes are adjusted using a non-linear optical effect in order to generate respective outputs for each bit. The DAC also comprises a photonic combiner (145) arranged to combine the outputs for each bit to generate the analog output signal (110).

16 Claims, 12 Drawing Sheets

(56) References Cited

OTHER PUBLICATIONS

Oda et al, "All-Optical Digital-to-Analog Conversion Using Nonlinear Optical Loop Mirrors", IEEE Photonics Technology Letters, vol. 18, No. 5, Mar. 1, 2006, pp. 703-705Ch.

International Search Report for PCT/EP2009/051815, mailed Jun. 12, 2009.

Oda et al., "All-Optical Digital-to-Analog Conversion Using Nonlinear Optical Loop Mirrors", *IEEE Photonics Technology Letters*, vol. 18, No. 15, Mar. 2006, pp. 703-705.

Scaffardi et al., "N-bit all-optical pattern matching by cross gain modulation in semiconductor optical amplifiers", *IEEE*, Aug. 2007, pp. 141-142.

Gehl et al., "2 Gb/s all-optical D/A converter", *IEEE Lasers and Electro-Optics Society*, Nov. 2008, pp. 441-442.

Saida et al., "Integrated optical digital-to-analogue converter and its application to pulse pattern recognition", *Electronic Letters*, vol. 37, No. 20, Sep. 2001, pp. 1237-1238.

\* cited by examiner

| MSB | LSB | OUT1 | OUT2 | OUT$_{tot}$ | Output Levels |
|---|---|---|---|---|---|
| 0 | 0 | 0 | 0 | 0 | 0 |
| 0 | 1 | $(1-\alpha_1) \cdot P_{pb} \cdot G_0$ | 0 | $(1-\alpha_1) \cdot P_{pb} \cdot G_0$ | 1 |
| 1 | 0 | 0 | $P_{pb} \cdot G_0$ | $P_{pb} \cdot G_0$ | 3 |
| 1 | 1 | ~0 | $P_{pb} \cdot G_s$ | $P_{pb} \cdot G_s$ | 2 |

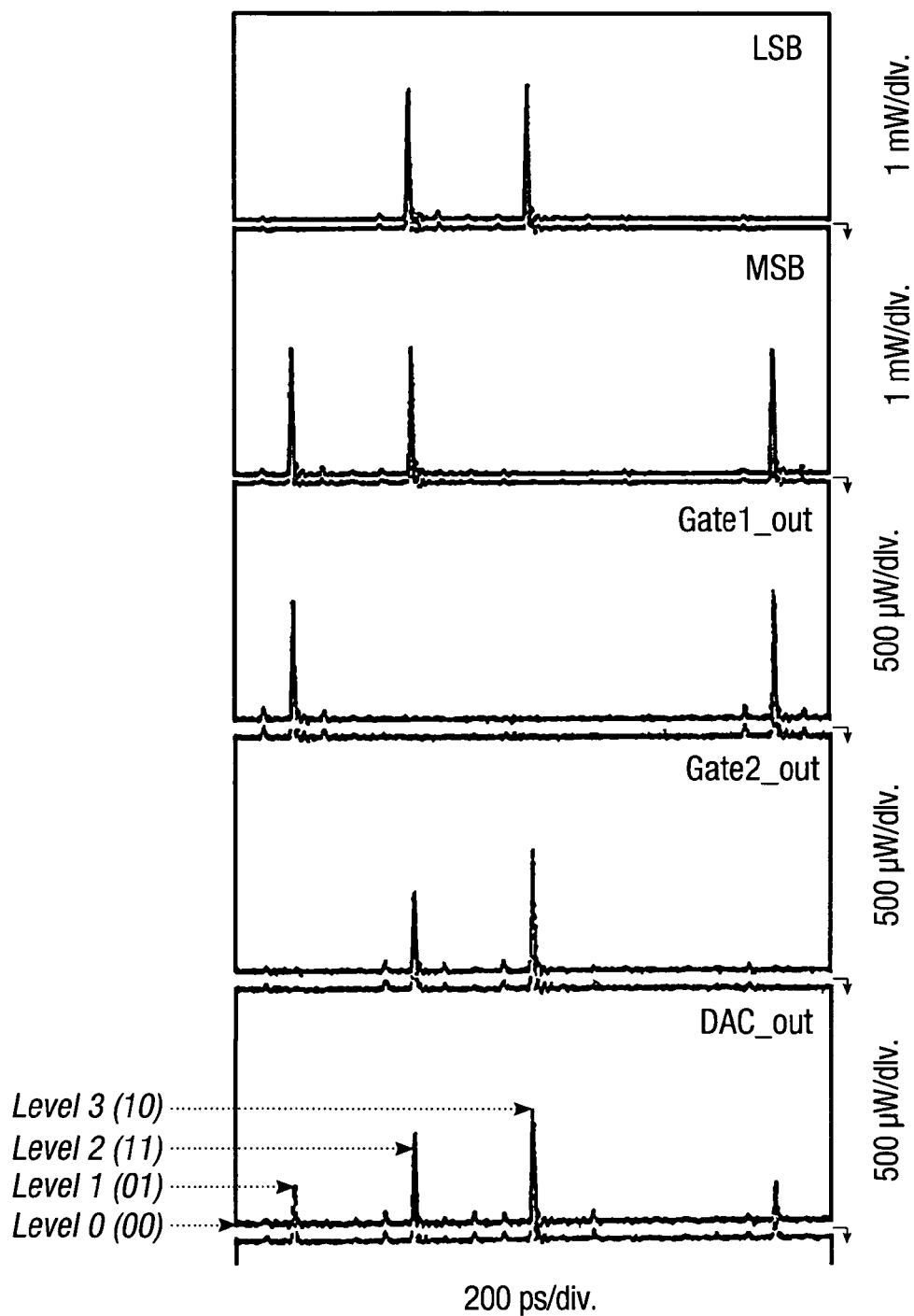

ured the U.S., the entire content of which is
OPTICAL DIGITAL-TO-ANALOG CONVERSTION This application is the U.S. national phase of International Application No. PCT/EP2009/051815 filed 16 Feb. 2009 which designated the U.S., the entire content of which is hereby incorporated by reference.

TECHNICAL FIELD

The present invention relates to Digital-to-Analog conversion in the optical or photonic domain.

BACKGROUND

Whilst digital-to-analog conversion (DAC) is well known in the electrical domain, so far little attention has been devoted to DAC in the optical or photonic domain. The use of all optical DAC could be used to implement ultra-fast signal processing functions such as pattern recognition for header extraction techniques, amplitude multiplexing (all level conversion) for increasing spectral efficiency or label/payload encoding techniques, and waveform generation for radar and display applications. Existing photonic DAC techniques utilize coherent optical summation however this requires accurate control of the phases of the signals to be summed or combined. A further technique uses non linear-optical-loop mirrors (NOLMs) interferometer switches and a probe signal comprising an optical pulse to produce quaternary amplitude shift key optical signal from a binary amplitude shift key signal, in the 2-bit implementation. However this scheme requires a separate probe signal, the generation of which is not integrable with the rest of the DAC photonic circuitry.

SUMMARY

The present invention provides a digital-to-analog converter (DAC) arranged to receive an N-bit digital optical signal and to process the N-bit digital optical signal to generate an analog optical signal. The DAC comprises a photonic circuit arranged to adjust the amplitude of each bit of the N-bit digital optical signal dependent on the amplitudes of at least one of the other bits of the N-bit digital optical signal. The amplitudes are adjusted using a non-linear optical effect in order to generate respective outputs for each bit. The DAC also comprises a photonic combiner arranged to combine the outputs for each bit to generate the analog output signal.

For the purposes of this specification, the term analog optical signal includes a $2^N$ multilevel signal which may then be converted into a continuous analog signal using an interpolation filter for example.

This arrangement allows for cost effective implementation and compactness without the need for coherent optical signals summation, nor an externally generated optical probe signal, and a reduction of the number of non-linear devices.

In an embodiment only the output from one of the bits, the other outputs being suppressed. This avoids the need for coherent summation of the outputs from each bit. The suppression may be effected by a zero value bit or full attenuation of a non-zero value bit.

The non-linear effect may be implemented using a non-linear optical device such as a semiconductor optical amplifier (SOA). In an embodiment, one SOA is used to receive each bit of the digital optical signal as a probe, the at least one other bit being used as a pump signal which controls the gain of the SOA.

In an embodiment the DAC comprises optical attenuators and/or polarization controllers and polarizers in order to control the output from each bit in order to generate an analogue signal having equally spaced predetermined levels.

BRIEF DESCRIPTION OF THE DRAWINGS

Embodiments will now be described with reference to the following drawings, by way of example only and without intending to be limiting, in which:

FIG. 4 is graph of the results of an experimental set up of the embodiment of FIG. 1;

DETAILED DESCRIPTION

Figure 1:
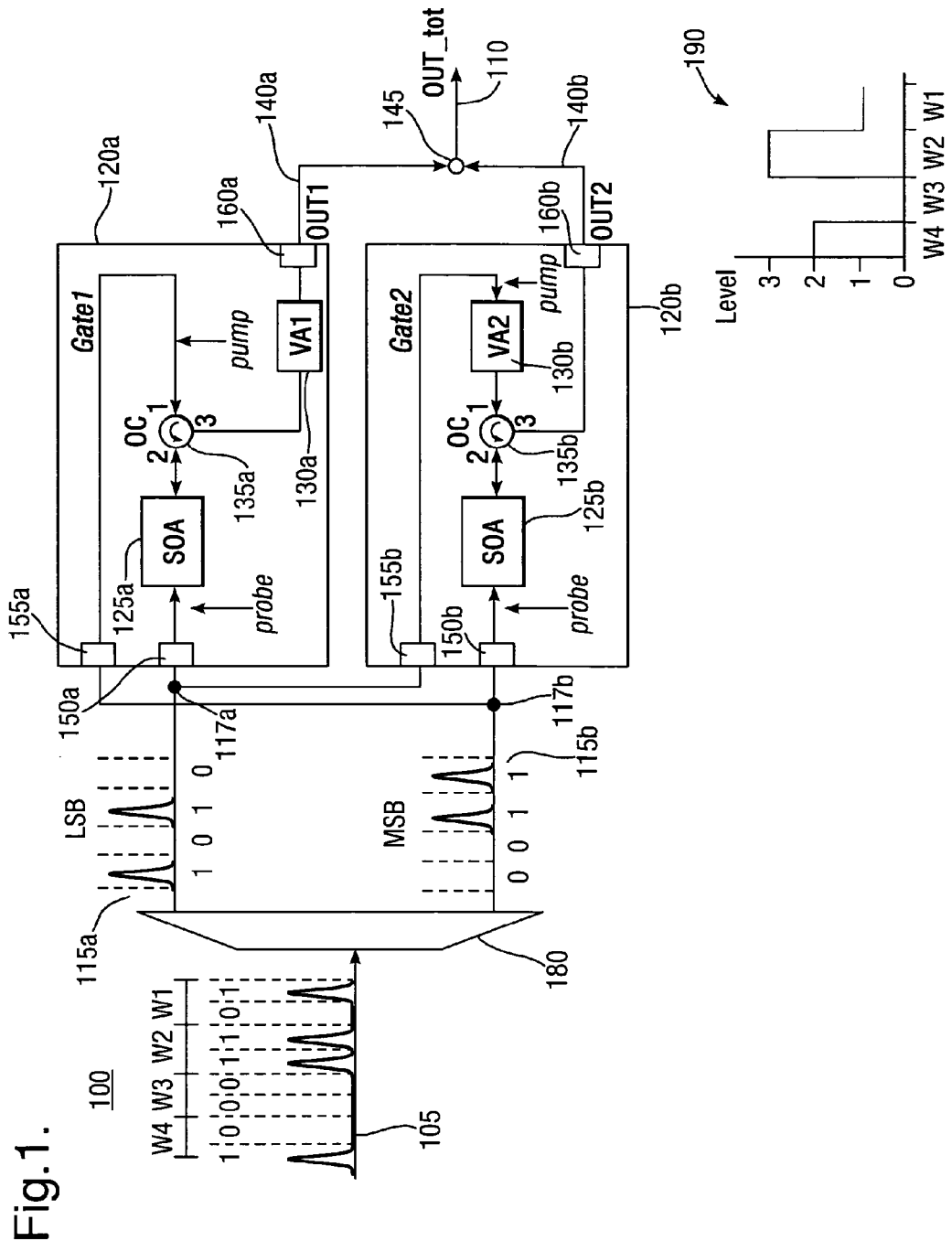
FIG. 1 shows a schematic of a 2 bit embodiment of an optical digital-to-analogue converter.

FIG. 1 shows a 2-bit digital-to-analog converter (DAC) which is arranged to receive a 2-bit digital optical signal and to process this 2-bit digital optical signal to generate an analog optical signal. The DAC 100 comprises two optical processing gates 120a and 120b which receive inputs from a serial-to-parallel converter 180 and output to a combiner 145. The optical processing gates, serial-to-parallel converter and combiner are photonic circuits arranged to process the incoming optical digital signal 105 into the analogue optical signal 190 in the optical domain. The optical digital signal comprises a sequence of light pulses arranged into 2-bit words (w1, w2, w3, w4). Each 2-bit word is converted by the DAC 100 into one of a number of outputs level of the analogue signal 190. As can be seen, word w1 (01) corresponds to analogue output level 1, w2 (11) corresponds to level 3, w3 (00) corresponds to level 0, and w4 corresponds to level 2, where the binary words are represented in Gray Code.

The serial-to-parallel converter 180 receives the light pulses of the digital optical signal, and for every two bit word, outputs the two bits in parallel at the same time. The least significant bits (LSB) 115a of the digital signal 105 are paired with the most significant bits (MSB) 115b of their respective words as can be seen. This allows the optical processing gates 120a and 120b to operate on the two bits of each word together. The LSB 115a are applied to a signal input 150a of a first optical processing gate 120a, and are also applied to a control input 155b of a second optical processing gate 120b, Conversely, the MSB 115b are applied to a signal input 150b of the second optical processing gate 120b, and are also applied to a control input 155a of the first optical processing gate 120a.

The first optical processing gate 120a comprises a semiconductor optical amplifier (SOA) 125a, an optical circulator 125a, and a variable optical attenuator 130a, The SOA 125a is a non-linear optical device which will be described in more detail below. In other embodiments, different non-linear optical devices may alternatively be used. The SOA 125a has a probe input which is coupled to the signal input 150a, and a pump input and output which is coupled to the optical circulator 135a, The optical circulator 135a is also coupled to one side of the variable attenuator 130a, and to the control input 155a, The other side of the variable attenuator 130a is coupled to an output 160a of the optical processing gate 120a, The optical circulator 135a is arranged to forward optical signals from the control input 155a to the SOA 125a, and also to forward optical signals from the SOA 125a to the variable attenuator 130a.

A similar arrangement exists for the second optical processing gate 120b, in which the probe side of a second SOA 125b is coupled to the signal input 150b, and the pump side and output of the second SOA 125b is coupled to a second optical circulator 135b, A second variable attenuator 130b is coupled between the optical circulator 135b and the control input 155b of the second optical processing gate 120b, Finally, the optical circulator 135b is also coupled to an output 160b of the second optical processing gate 120b, The outputs 160a and 160b of each optical processing gate 120a and 120b are coupled to the combiner 145.

In this way the processed light signals output from the two optical processing gates 120a and 120b are combined in order to generate the analogue optical signal 190. In particular, the amplitudes of the bits (LSB and MSB) applied to the signal inputs 150a and 150b of the respective gates 120a and 120b are adjusted dependent on the amplitude of the other bit (MSB and LSB). This is achieved by using the bit applied to the control gate 155a or 155b to control the gain of the SOA 125a or 125b, By adjusting the gain of the SOA, the amplitude at the output 160a (140a) and 160b (140b) of the bit applied to the signal input 155a or 155b can be adjusted dependent on the bit applied to the respective control input 155a or 155b, The variable attenuators 130a and 130b are used to scale the amplitude of the respective control or signal light pulses in order to control the amplitude of the output light pulse from each gate 120a and 120b so that they combine to generate the appropriate analogue level as would be understood by those skilled in the art.

Figures 2, 3:
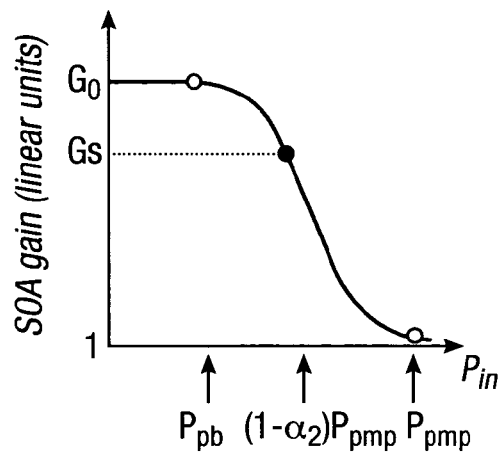
FIG. 2 shows a non-linear semi-conductor optical amplifier (SOA) gain characteristic for the non-linear optical devices of FIG. 1.
FIG. 3 is a table illustrating the outputs for each input bit for the embodiment of FIG. 1.

The gain characteristic of an SOA which can be used as the first and/or second non-linear optical device 125a/125b is non-linear and is shown in FIG. 2. FIG. 2 shows the gain applied by the SOA to the incoming probe signal (eg LSB 115a for SOA 125a) as a function of the applied pump signal (eg MSB 115b). As can be seen for low values of the pump signal, for example MSB=0, the probe signal LSB=1 or 0 is strongly amplified. The small-signal or unsaturated gain $G_0$, is the maximum available gain from the amplifier. However for high values of the pump signal (e.g. MSB=1) then the amplifier gain is saturated and the probe signal (LSB=1 or 0) is amplified to a gain level $G_s$ lower than $G_0$ or not amplified at all (gain G=1), depending on the power level of the pump signal applied to the SOA. Typically, the input power level of the input probe signal is very low, which means that the output level is also very low in the strongly saturated amplifier case (G=1), and it can be approximated to zero. Thus depending on the control pump level, the gain experienced by the probe signal is varied between the two limits condition of maximum gain (G=$G_0$) and transparency (G=1).

FIG. 3 is a table for the DAC 100 showing the digital input values for the MSB input signal 115b and the LSB input signal 115a, the corresponding analogue output amplitudes for the OUT1 140a output signal from the first optical processing gate 120a and the OUT2 140b output signal from the second optical processing gate 120b, $OUT_{tot}$ is the combined amplitude of the OUT1 and OUT2 signals, and the output levels are the predetermined output levels corresponding to different digital values of the incoming words. The various analogue output amplitudes are described in more detail below.

The output OUT1 of the first gate 120a has a power level proportional to $a_{pb} \cdot P_{pb} \cdot G_{SOA}$, where $a_{pb}$ is the logical value of the probe bit (LSB) 115a, $P_{pb}$ is the peak power level of the probe bit (LSB) 115a, and $G_{SOA}$ the single-pass gain of the optical amplifier, whose value is set by the peak power of the pump pulse bit (MSB) 115b, Thus, if probe bit (LSB) has logical value "0" the output of the gate is in the low state, whatever the pump bit logical value is. If the probe bit (LSB) logical value is "1" and the pump bit (MSB) logical value is "0" the gate output is $P_{pb} \cdot G_0$, where $G_0$ is the unsaturated (small-signal) single-pass gain of the SOA. If the probe bit (LSB) has logical value "1" and the pump bit (MSB) has logical value "1" the gate output is proportional to $P_{pb} \cdot G_s$, where $G_s$ is the saturated gain of the amplifier, as set by the peak power of the pump bit, with $G_s \leq G_0$. Thus the output of the nonlinear gate in this last case can be made arbitrarily lower than $P_{pb} \cdot G_0$ by exploiting the cross-gain compression (XGC) effect experienced by the probe signal depending on the value of the pump peak power. The pump and probe pulses are arranged to cross the SOA simultaneously. This may be implemented using optical delay lines (not shown) as would be appreciated by those skilled in the art.

Thus, the output OUT1 will be in the low state when LSB is a logical "0" for any value of the MSB. If LSB is a logical "1", there are two possible cases:

1) LSB is "1" AND MSB is "0": the LSB experiences a non-saturated gain $G_0$ in the amplifier. The output pulse peak power of gate1 is approximately given by $(1-\alpha_1) \cdot P_{pb} \cdot G_0$, being $\alpha_1$ the attenuation coefficient of variable attenuator 130a ($0<\alpha_1<1$).

2) LSB is "1" AND MSB is "1": the power level $P_{pmp}$ of the MSB pulse is set to a value $P_{pmp}$ that strongly compresses the SOA gain. As a result the gain experienced by the LSB (with peak power $P_{pb}$) is negligible, since $G(P_{pmp}) \approx 1$ in this case, and the output peak power of the gate is $(1-\alpha_1) \cdot P_{pb}$. If we assume, as usual, that $G_0 >> 1$, and $P_{pb} << 1$, we can assume the output of this gate 120a to be in the low sate also for this case.

On the other hand, the output OUT2 for the second optical processing gate 130b is proportional to the power level of the MSB—its probe signal. OUT2 is in the low state if the MSB is "0", for any value of the LSB. If the MSB is "1", the following two cases are possible:

1) MSB is "1" AND LSB is "0": the output pulse peak power is $G_0 \cdot P_{pb}$.

2) MSB is "1" AND LSB is "1": in this case the gain experienced by the MSB pulse signal (with peak power $P_{pb}$) is Gs=G[$(1-\alpha_2) \cdot P_{pmp}$], where $\alpha_2$ is the attenuation coefficient of variable attenuator 130b ($0<\alpha_2<1$). The value of $\alpha_2$ is set in such a way that the power of the pump pulse partially saturate the SOA 125b in the second gate 120b to a the proper value $G_s$. The OUT2 output pulse peak power is thus given by $G_s \cdot P_{pb}$.

The 2-bit DAC output 110 can be taken by combining the output of the two gates, with a standard fiber coupler. The table of FIG. 3 summarize the two gates output and the total output (in terms of peak pulse power) for the four possible combinations of the LSB and MSB logical values. It can be seen that, in order to properly avoid coherent summation at the standard coupler, only one of the two gates output produces an optical power level different from zero for any possible sequence of the input words. In order to assist this feature, the probe suppression ratio of the strongly saturated gain should preferably be high enough (in particular, for the case LSB=1 and MSB=1, the output of gate1 should be much lower than the corresponding output of gate2). If required, the necessary probe suppression ratio can be achieved using appropriate optical power attenuation technique as described below.

Optical power attenuation may be implemented by using a polarizer (see FIG. 11) at the output of the nonlinear gate and properly adjusting polarization controllers on the probe input/output path. This increases the suppression capability of the gate when both the LSB and MSB assumed the logical "1" value, by exploiting the nonlinear polarization rotation (NPR) effect in the saturated amplifier. This further avoids residual coherent summation at the gate output coupler when the outputs of gate1 and gate2 are combined for the case LSB=1 and MSB=1 (see table 1). It should be noted that this modification doesn't affect the operation principle of the device, which could also be implemented with other nonlinear optical devices, provided that the extinction ratio of the gate1 for the case LSB=1 and MSB=1 is sufficiently high.

The splitters 117a and 117b are used to provide two copies of the LSB and MSB into the two gates 120a and 120b, These splitters may be arranged to split the power of these pulses equally but the splitting ratio could be different so that optical variable attenuators on the pump (control) and probe (signal) input (path) are then used to refine the power level to the optimal values at SOAs inputs. Typically the two SOAs are identical, that is, they have the same small-signal gain $G_0$, the same saturation power $P_{sat}$, and carrier recombination time $T_s$. However variations on these arrangements other circuit structures can be used in alternative embodiments.

From the table of FIG. 3 it can be seen that analog-to-digital conversion implementing a Gray code can be realized by properly controlling the values of the attenuation coefficients $\alpha_1$ and $\alpha_2$ of the variable attenuators 130a and 130b in the two gates 120a and 120b, in order to match the two following conditions:

$$Gs=G[(1-\alpha_2) \cdot Ppb]=(2/3) \cdot G0$$

and $$(1-\alpha_1) \cdot G0=(1/3) \cdot G0$$

Under these conditions, four equally spaced predetermined output levels at the output 110 of the 2-bit DAC are generated accordingly to the following cases:

1) LSB=0, MSB=0; DAC output equals to 0 (level 0)
2) LSB=1, MSB=0; DAC output equals to (1/3)·Ppb·$G_0$ (level 1)
3) LSB=1, MSB=1; DAC output equals to (2/3)·$P_{pb}$·$G_0$ (level 2)
4) LSB=O, MSB=1; DAC output equals to Ppb·$G_0$ (level 3)

A practical circuit arrangement may include further optical variable attenuators to adjust the power level of the pump (control) and probe (signal) path to the appropriate level inside the SOAs and/or not induce damages to the semiconductor amplifiers. Similarly, optical delay lines (not shown) need also to be employed in order to ensure the timing of the light pulses associated with each bit are effective. The parameters of these devices may be determined by standard experimentation or calculation as would be appreciated.

In an experimental set-up of the arrangement of FIG. 1, the power levels of the probe signals (for both gates) was about −20 dBm (average power), whereas the pump average power was −3 dBm and −12 dBm at the SOAs in gate1 and gate2, respectively. The SOAs had a small-signal gain $G_0$ of about 25 dB at the signal wavelength, a 3-dB output saturation power of 11 dBm and an estimated gain recovery time constant of ~200 ps. The time flows at various stage of the 2-bit DAC are shown in FIG. 4. From top to bottom the data flows of LSB, MSB, gate1 output, gate2 output, and final coupler output are shown, respectively. By adjusting the power levels in the two gates and before the output coupler as described before, implementation of a Gray code DAC was performed.

Figure 5A:
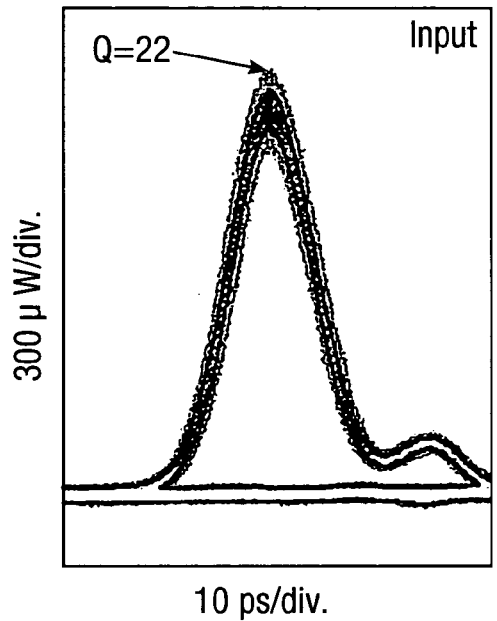
FIG. 5 is an input/output eye diagram of the results of the experimental set up of the embodiment of FIG. 1.
Figure 5B:
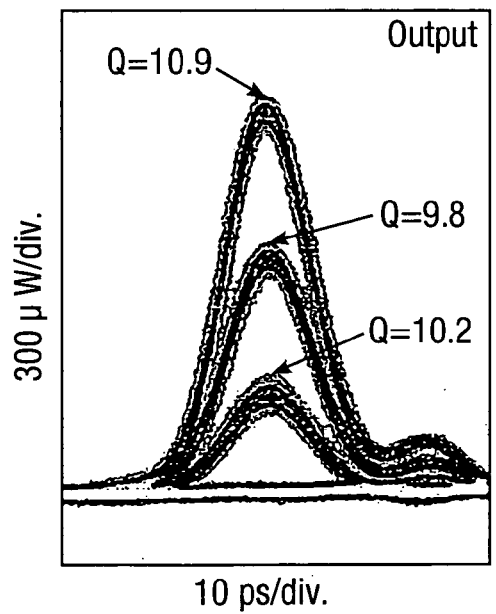

In FIG. 5A and FIG. 5B, the input and output eye diagrams are respectively represented, showing a clearly open 4-level eye at the output of the device. The input binary signal Q factor was measured to be 22, whereas the output 3 Q factors corresponding to level1-tolevel0 eye, level 2-to-level1 eye and level3-to-level2 eye were measured to be 1 0.2, 9.8, and 1 0.9, respectively.

Figure 6:
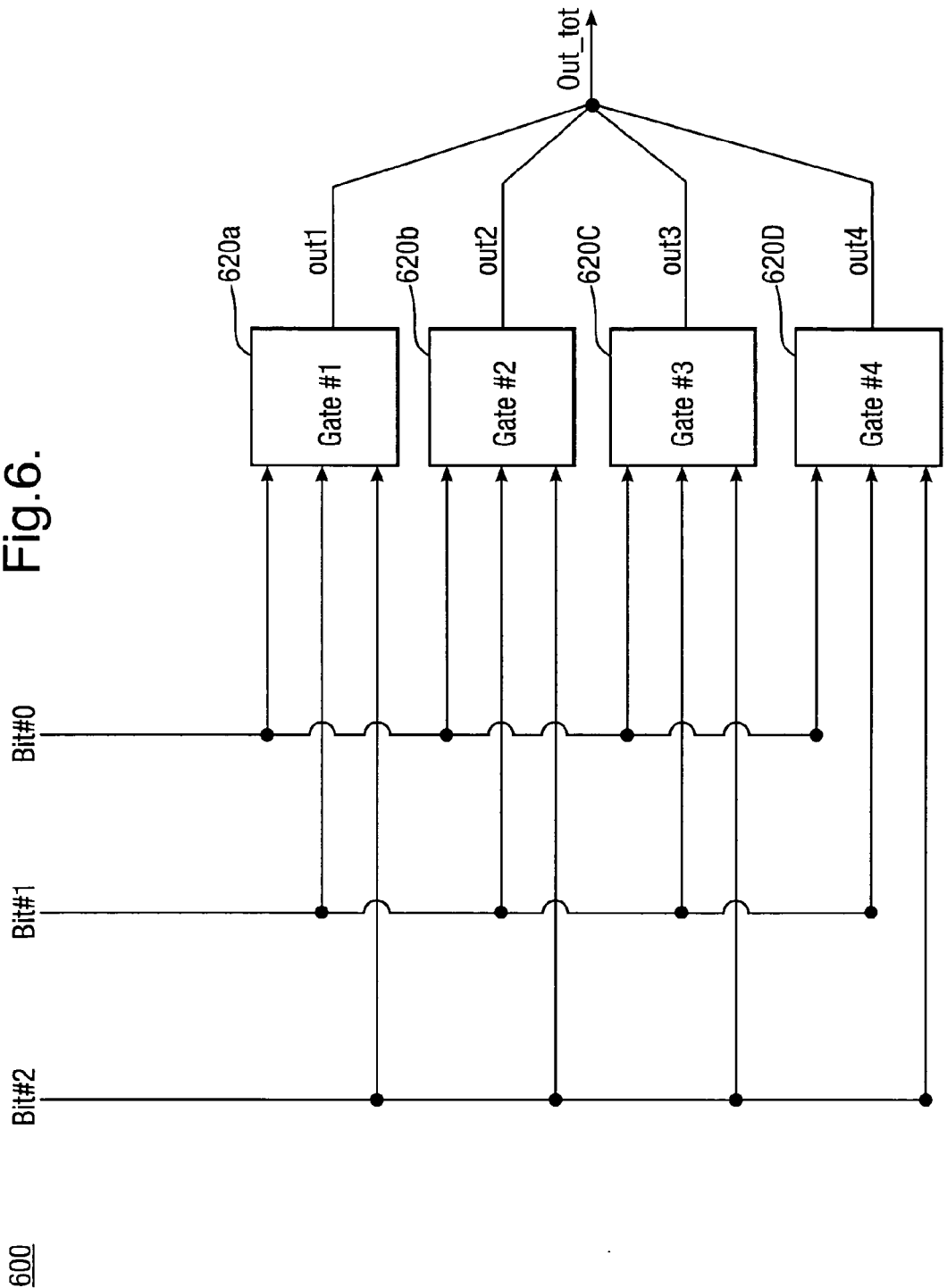
FIG. 6 shows a schematic of a 3 bit embodiment of an optical digital-to-analogue converter.
Figure 7:
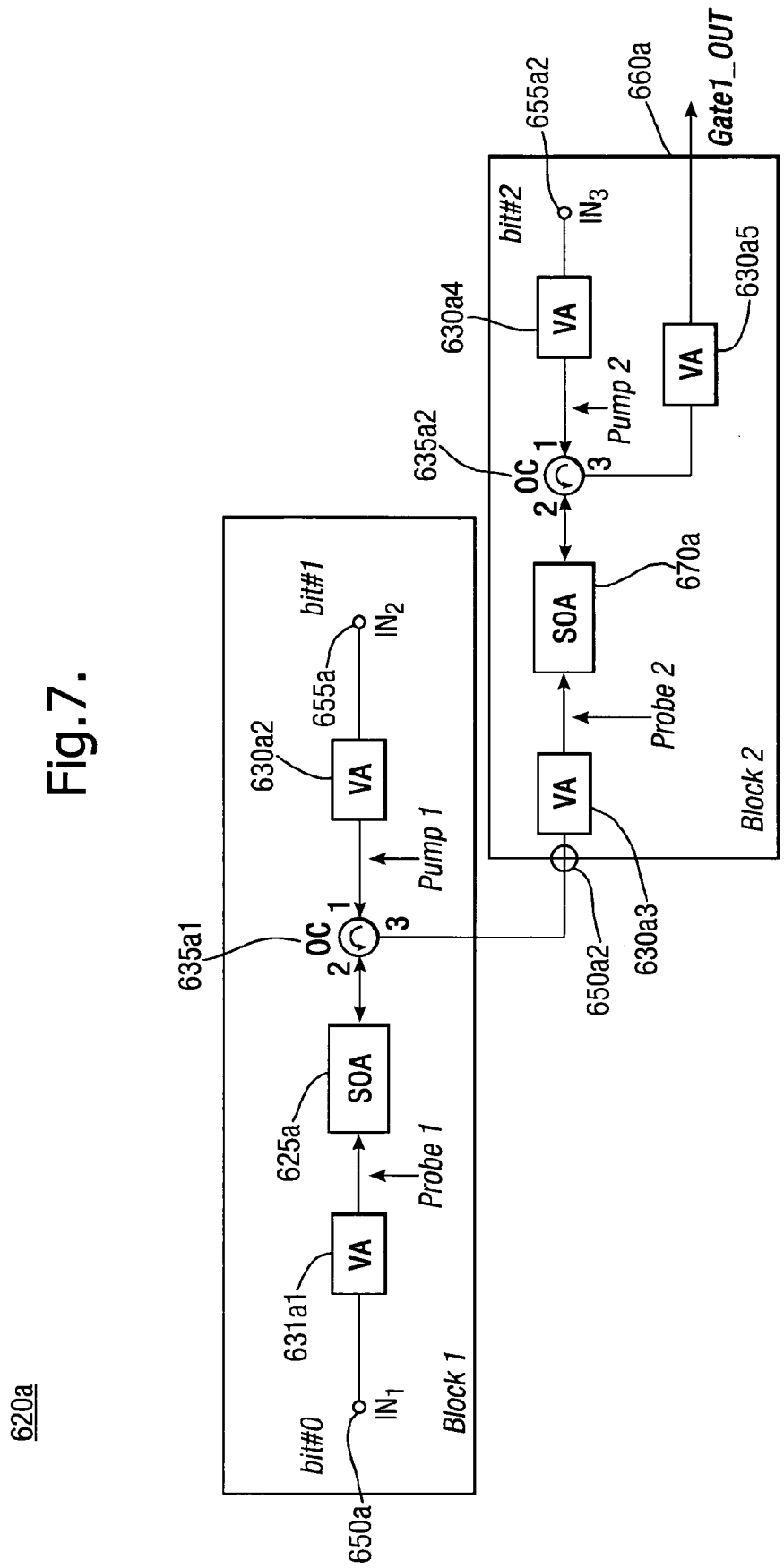
FIGS. 7-10 are schematics for the optical processing gates for the 3 bit embodiment of FIG. 6.

FIG. 6 illustrates a 3 bit optical digital to analogue converter (DAC). The DAC 600 comprises four optical processing gates 620a-620d each having an output (OUT1-OUT 4) coupled to a combiner 645. The DAC 600 receives three input bits bit#1, bit#2, bit#3 from each word received and these are input to each of the four gates 620a-620d—either at a signal or one of two control inputs. The first optical processing gate 620a is shown in more detail in FIG. 7. The gate 620a comprises two blocks, the first block being similar to the first gate 120a of the 2-bit implementation and comprising: a first signal input 650a1 which is coupled to a probe input of a first SOA 625a via an optical variable attenuator 630a1; a first control input 655a1 coupled to a first port (1) of a first optical circulator 635a1 via another variable attenuator 630a2; the second port (2) of the first optical circulator 635a 1 being coupled to a pump input and output of the first SOA 625a, and the third port (3) being coupled to a second signal input 650a2 to the second block. The second block of the first optical processing gate 620a comprises: a second SOA 625b having a probe input coupled to the second signal input 650a2 via a variable attenuator 630a3; a second control input 665a2 coupled to a first port (1) of a second optical circulator 635a2 via another variable attenuator 630a4; the second port (2) of the second optical circulator 635a2 being coupled to a pump input and output of the second SOA 670a, and the third port (3) being coupled to an output 660a of the second block of the first optical processing gate 620a.

Figure 8:
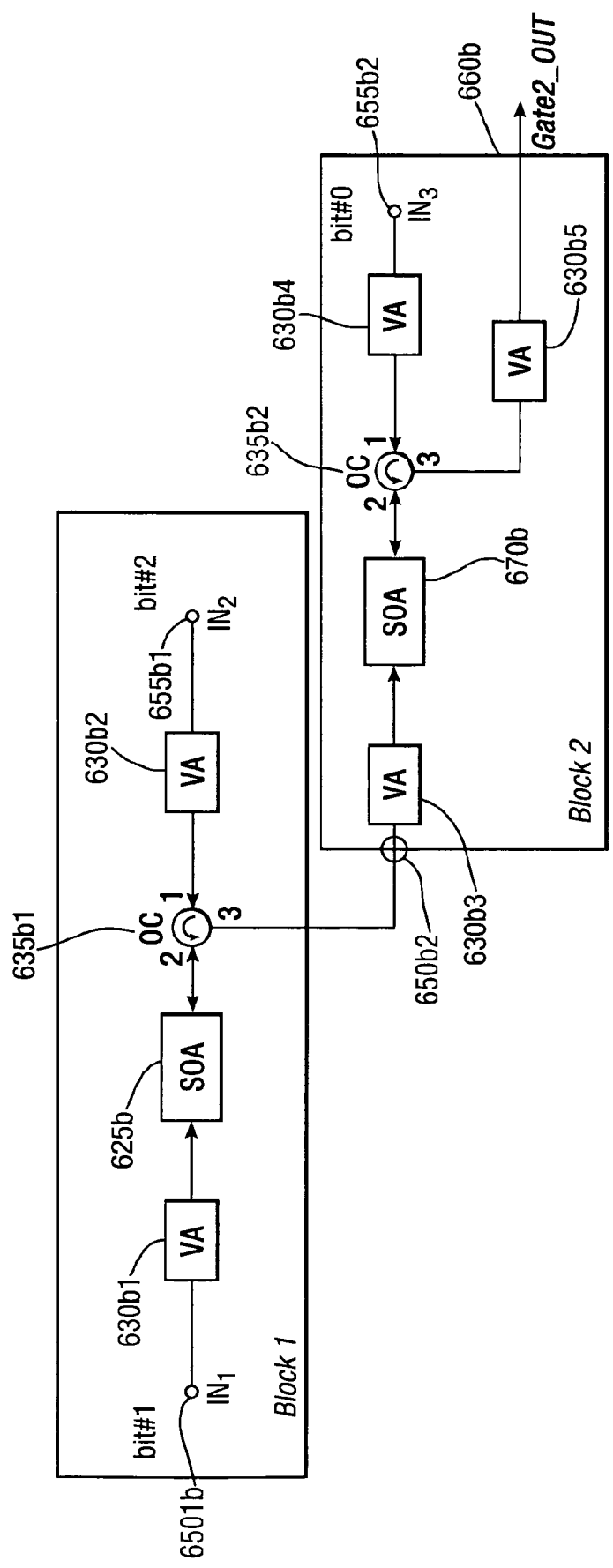
Figure 9:
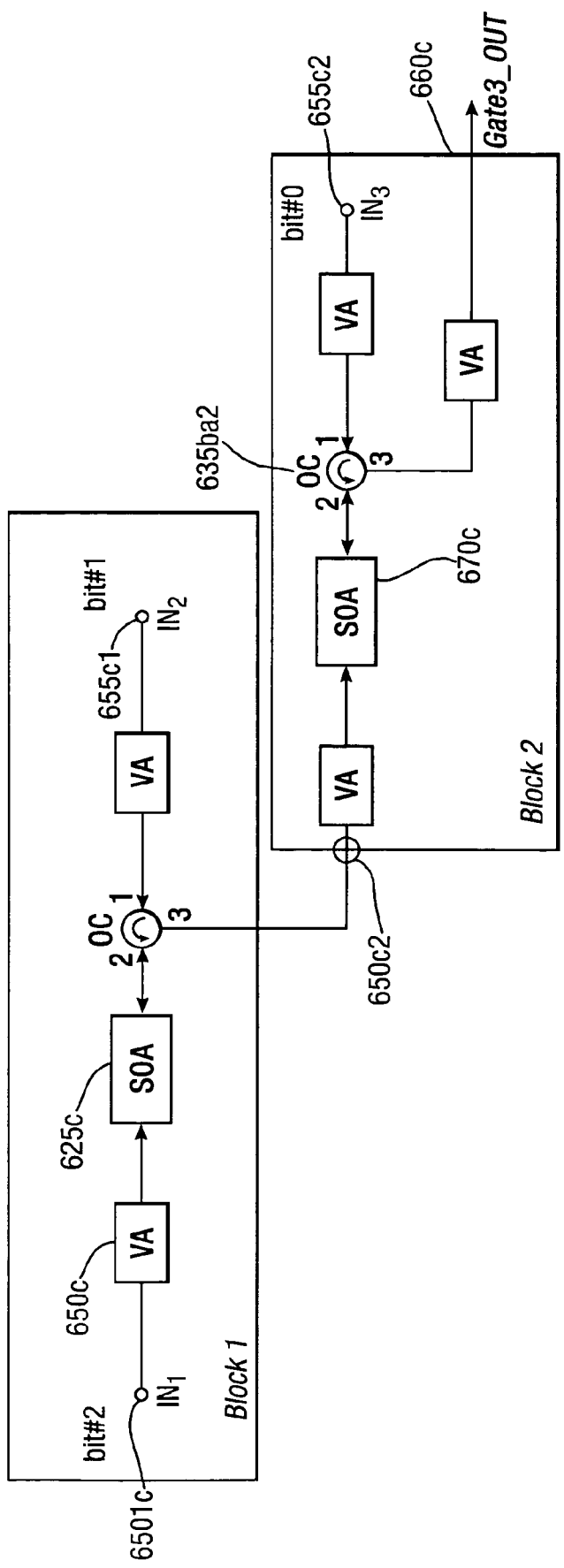

The second and third optical processing gates 620b and 620c are implemented in a similar manner as shown respectively in FIGS. 8 and 9; with each gate using different bits for their signal, and first and second control gates. Thus in each case the amplitude of the signal bits are adjusted dependent on the amplitudes of the control bits in order to generate an output for each optical processing bit.

Figure 10:
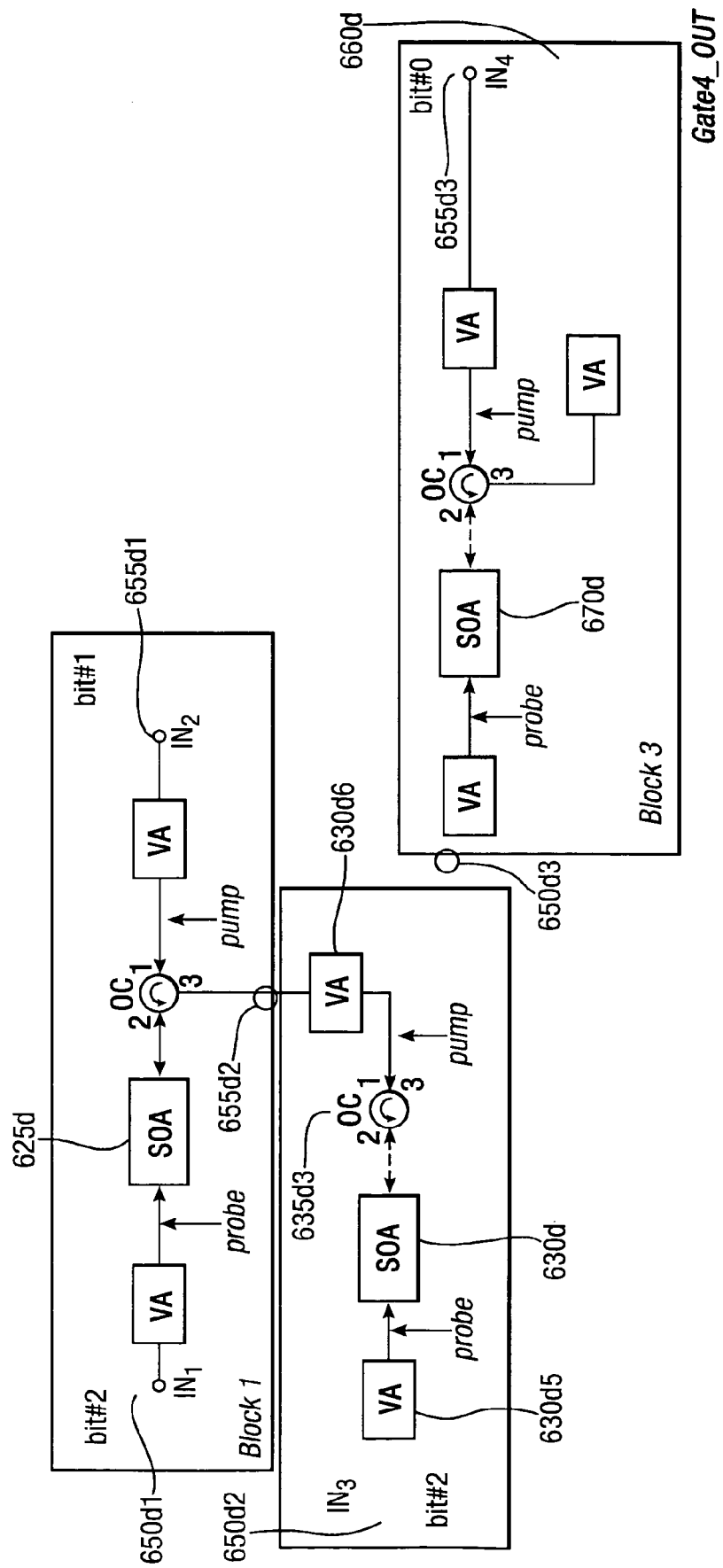

The fourth optical processing gate 620d is implemented in a different way as shown in FIG. 10. Here three SOA blocks are used to build the gate 620d, The gate 620d is arranged such that its output 660d is proportional to bit #2, since the only signal input port that is connected to the Gate4 output 660d is IN3—via the probe input port 650d3 of block3. The other input ports are employed as pump signals. The table below summarizes the input-output characteristics of Gate4 620d,

| bit#2 | bit#1 | bit#0 | OUT_gate4 |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |

-continued

| bit#2 | bit#1 | bit#0 | OUT_gate4 |
|---|---|---|---|
| 1 | 0 | 1 | 0 |
| 1 | 1 | 0 | $(1 - \alpha_4)G_0 P_{IN}$ |
| 1 | 1 | 1 | $(1 - \alpha_4)G_s^4 P_{IN}$ |

If bit #2=0, then Gate4_out=0, whatever the values of bit #1 and bit #3 are. If bit #2=1 AND bit #1=0 the output is still in the low state (i.e. zero) since the output of block 1 is in the high state (block1_out is proportional to bit #2, provided that bit #1 is in the low state), and the variable attenuator on the pump path of block2 is set in such a way that the output of block1, which acts as a pump in block2, strongly compresses the SOA in block2. Thus, If bit #2=1 AND bit #1=0 the output of the gate4 is still in the low state (i.e. zero), whatever the value of bit #0 is, because there is no power on the probe input port of block3. This case covers the 5th and 6th rows of the table in the figure. If bit #2=1 AND bit #1=1 the output of block2 is now in the high state, since there is no power at the output of block1 (the VA in the pump path of block #1 is set in such a way that the SOA gain in block1 is strongly compressed). Thus there is power level different from zero at the output of block2, which is also the probe input port of block3. Thus the output of the gate4 in this case (bit #2=1 AND bit #1=1) depends on the value of bit #0 and the VA in the pump path of block3. If bit #0=0, than the probe signal in block3 experiences the maximum gain $G_0$ from the SOA, and the output is given by $(1-\alpha_4)G_0 P_{IN}$, where $\alpha_4$ is the attenuation coefficient of VA on the output path of Gate4, and $P_{IN}$ is the probe power at the input of the SOA in block3. This covers the 7th row of the table. On the other hand, if bit #0=1 then the VA in the pump path of block3 is adjusted in such a way that bit #0 partially saturates the SOA to a value Gs4, and the gate4 output is thus (1−α4)Gs4PIN. This covers the last row of the table.

A gray code can be correctly realized by combining the outputs of the different gates and controlling the variable attenuators in order to satisfy the following conditions for the attenuation coefficients $\alpha_n$ in the output blocks of the n-th gate and the saturated gains $G_s^n$ of the SOAs in the n-th gate:

$$(1-\alpha_1)=(1-\alpha_3)/7 \qquad 1:$$

$$G_s^n=(2/3)G_0 \qquad 2:$$

$$(1-\alpha_2)=3(1-\alpha_3)/7 \qquad 3:$$

$$G_s^4=(4/5)G_0 \qquad 4:$$

$$(1-\alpha_4)=5(1-\alpha_3)/7 \qquad 5:$$

$$G_s^3=(6/7)G_0 \qquad 6:$$

The values of the digital inputs and gate outputs is summarized in the table below:

| bit#2 | bit#1 | bit#0 | OUT1 | OUT2 | OUT3 | OUT4 | OUT_tot | |
|---|---|---|---|---|---|---|---|---|
| 0 | 0 | 0 | 0 | 0 | 0 | 0 | 0 | Level 0 |
| 0 | 0 | 1 | $(1 - \alpha_1)G_0 P_{IN}$ | 0 | 0 | 0 | $(1 - \alpha_1)G_0 P_{IN}$ | Level 1 |
| 0 | 1 | 0 | 0 | $(1 - \alpha_2)G_0 P_{IN}$ | 0 | 0 | $(1 - \alpha_2)G_0 P_{IN}$ | Level 3 |
| 0 | 1 | 1 | 0 | $(1 - \alpha_2)G_s^2 P_{IN}$ | 0 | 0 | $(1 - \alpha_2)G_s^2 P_{IN}$ | Level 2 |
| 1 | 0 | 0 | 0 | 0 | $(1 - \alpha_3)G_0 P_{IN}$ | 0 | $(1 - \alpha_3)G_0 P_{IN}$ | Level 7 |
| 1 | 0 | 1 | 0 | 0 | $(1 - \alpha_3)G_s^3 P_{IN}$ | 0 | $(1 - \alpha_3)G_s^3 P_{IN}$ | Level 6 |
| 1 | 1 | 0 | 0 | 0 | 0 | $(1 - \alpha_4)G_s^4 P_{IN}$ | $(1 - \alpha_4)G_s^4 P_{IN}$ | Level 4 |
| 1 | 1 | 1 | 0 | 0 | 0 | $(1 - \alpha_4)G_0 P_{IN}$ | $(1 - \alpha_4)G_0 P_{IN}$ | Level 5 |

Again it can be seen that significant output signal amplitudes are only generated from one of the gates for each digital value, the output signal amplitudes from the other gates being substantially suppressed by appropriate variable attenuator parameters.

In this 3 bit implementation four gates 620a-620b are needed, since each gate provides up to two different output levels, and 8 analogue levels are required at the output of the DAC 600. In general, for an n-bit DAC using this type of implementation a number of gates equal to $2^{n-1}$ is required. However the optical processing gates described may be combined with other photonic circuit arrangements in order to reduce the number of gates or SOA used—for example by employing SOAs in a Mach-Zehnder-Interferometer configuration (SOA-MZI)

Figure 13:
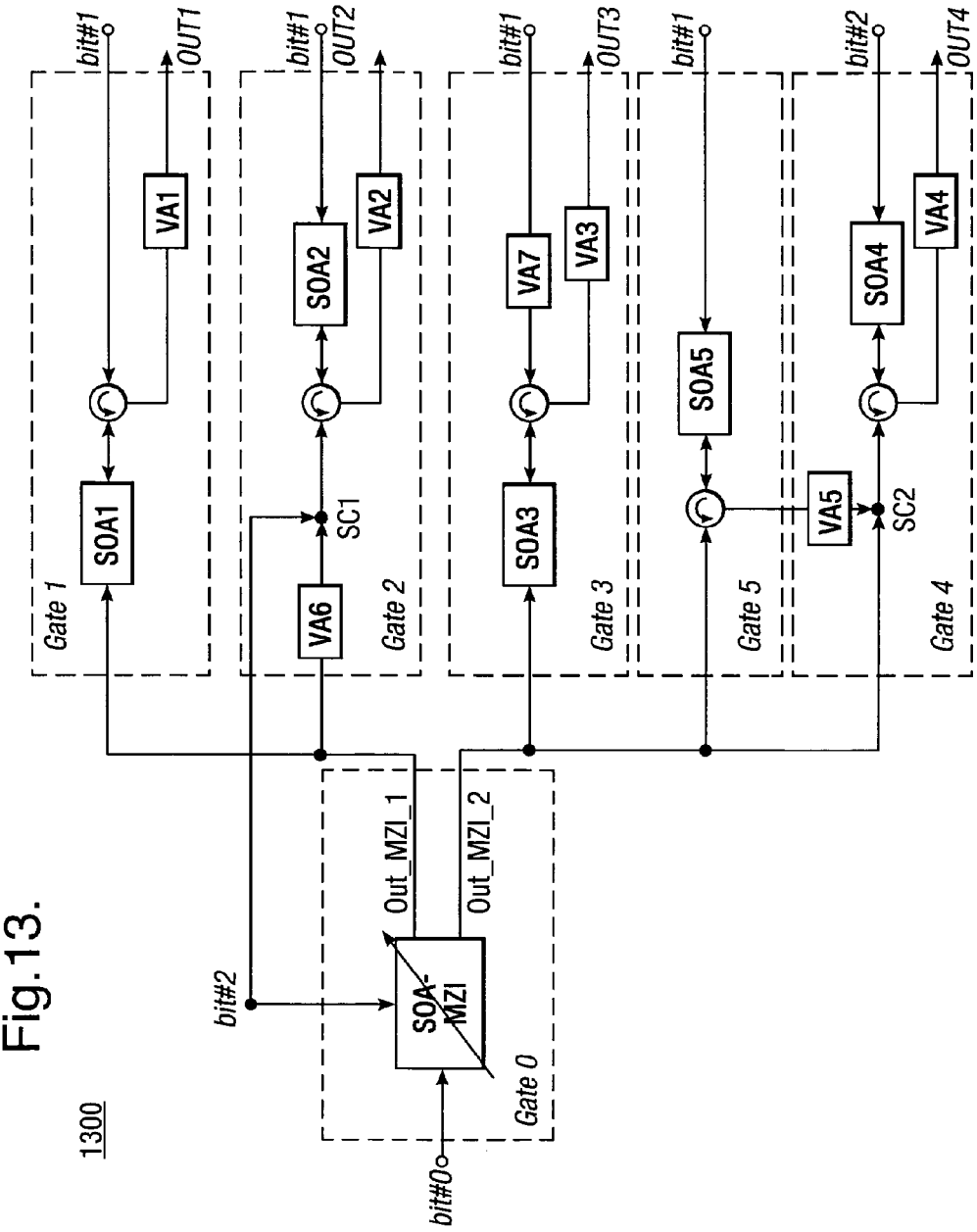
FIG. 13 shows a schematic of another 3 bit embodiment of an optical digital-to-analogue converter.

A 3-bit embodiment using an SOA-MZI is shown in FIG. 13. This arrangement reduces the number of non-linear devices required compared with the embodiment of FIGS. 6-10. The DAC 1300 comprises 6 nonlinear devices. The device has four outputs (named OUT1, OUT2, OUT3 and OUT4, in the figure). The relationship between the input bit combinations and the outputs of the gate is summarized in the following table:

| bit#2 | bit#1 | bit#0 | OUT1 | OUT2 | OUT3 | OUT4 | OUT_tot | |
|---|---|---|---|---|---|---|---|---|
| 0 | 0 | 0 | 0 | 0 | 0 | 0 | 0 | Level 0 |
| 0 | 0 | 1 | $(1-\alpha_1)G_0 P_{IN}$ | 0 | 0 | 0 | $(1-\alpha_1)G_0 P_{IN}$ | Level 1 |
| 0 | 1 | 0 | 0 | $(1-\alpha_2)G_0 P_{IN}$ | 0 | 0 | $(1-\alpha_2)G_0 P_{IN}$ | Level 3 |
| 0 | 1 | 1 | 0 | $(1-\alpha_2)G_s^2 P_{IN}$ | 0 | 0 | $(1-\alpha_2)G_s^2 P_{IN}$ | Level 2 |
| 1 | 0 | 0 | 0 | 0 | 0 | $(1-\alpha_4)G_0 P_{IN}$ | $(1-\alpha_4)G_0 P_{IN}$ | Level 7 |
| 1 | 0 | 1 | 0 | 0 | $(1-\alpha_3)G_0 P_{IN}$ | 0 | $(1-\alpha_3)G_0 P_{IN}$ | Level 6 |
| 1 | 1 | 0 | 0 | 0 | 0 | $(1-\alpha_4)G_s^4 P_{IN}$ | $(1-\alpha_4)G_s^4 P_{IN}$ | Level 4 |
| 1 | 1 | 1 | 0 | 0 | $(1-\alpha_3)G_s^3 P_{IN}$ | 0 | $(1-\alpha_3)G_s^3 P_{IN}$ | Level 5 |

$G_0$ represents the unsaturated SOA gain (the same for all the amplifiers), $G_0^n$ is the saturated gain of the n-th SOA, and $\alpha_n$ is the attenuation coefficient of the n-th optical variable attenuator (VA), respectively. $P_{IN}$ is the pulse peak power associated with the logical "1" vale of the input probe bit. Since none of the four outputs is simultaneously different from zero, they can be combined with standard fiber couplers to generate the total output (total_out in the table). A two-outputs gate (Gate0) is used to switch bit #0 toward two possible paths: Out_MZI_1 and Out_MZI_2, in the figure, depending on the logical value of bit #2. A possible device to implement Gate0 is a commercially available SOA in Mach-Zehnder Configuration (SOA-MZI). Other devices could alternatively be used. Gate0 is biased in such a way that, when bit #2=0, bit #0 is routed toward the Out_MZI_1 path (Gate0 in cross state). If bit #2=1, Gate0 changes its state in such a way that bit #0 is routed toward the Out_MZI_2 path (Gate0 in bar state).

Gate1: OUT1 is proportional to bit #0. Thus OUT1 is equal to 0 if bit #0=0 or bit #2=1 (since in this case bit #0 is routed toward the Out_MZI_2 path) or bit #1=1 (because bit #1 acts as a pump for SOA1 and its value is properly set to completely bleach SOA1 gain). Thus the output of Gate 1 is different from 0 only for the bit combination "001" and its value is given by $(1-\alpha_1)G_0 P_{IN}$ (no signal saturates the gain of SOA1)

Gate2: OUT2 is proportional to bit #1. Thus, OUT2 is equal to 0 if bit #1=0 or bit #2=1 (because bit #2 act as a pump for SOA2 and its value is properly set to completely bleach SOA2 gain). For the case "010" OUT2 will be given by $(1-\alpha_2)G_0 P_{IN}$, since no pump signal saturates SOA2 gain, whereas for the case "011" bit #0 coming from Out_MZI_1 path is used to partially saturate the gain of SOA2 (by properly setting the value of VA6). The output, in this case, is given by $(1-\alpha_2)G_s^2 P_{IN}$. It can be noted that in Gate2 the signal coming from Out_MZI_1 is coupled with bith #2 in the standard coupler 1 (SC1). However, since the two input of the coupler can never be simultaneously different from 0 (when bit #2=1, bit #0 at the input of Gate0 is routed toward the Out_MZI_2 path) there can be no interference in SC1.

Gate3: OUT3 is proportional to bit #0. Thus OUT3 is equal to 0 only if bit #0=0 or bit #2=0 (since in this case bit #0 is routed toward the Out_MZI_1 path of Gate0). For the case "101" OUT3 will be given by $(1-\alpha_3)G_0 P_{IN}$ because bit #0, coming from Out_MZI_2 path experiences an unsaturated gain in SOA3. On the other hand, for the case "111" the value of VA7 is properly set in such a way that bit #1 partially saturates the gain of SOA3. OUT3 is then given by $(1-\alpha_3) G_s^3 P_{IN}$.

Gate4: OUT4 is proportional to bit #2. Thus OUT4 is equal to 0 only if bit #2=0 or bit #0=1 AND bit #2=1 (since in this case bit #0, which is routed toward the Out_MZI_1 path of Gate0 act as a pump for SOA4 and its power level is set to completely bleach SOA4 gain). For the case "100" OUT4 will be given by $(1-\alpha_4)G_0 P_{IN}$, since no pump signal saturates SOA4 gain, whereas for the case "110" the output of Gate5 (proportional to bit #1) is exploited to partially saturates SOA4 gain (by means of VA5). It can be noted that in Gate4 the signal coming from Out_MZI_2 is coupled with the output of Gate5 in the standard coupler 2 (SC2). It is also straightforward from the scheme that the signal coming from Out_MZI_2 is different from 0 only when bit #0=1 AND bit #2=1, For this situation, whatever the value of bit #1, the output of Gate5 is always equal to 0 since the signal coming from Out_MZI_2 path acts as a strong pump signal for SOA5, thus shooting down the gain experienced by bit #1.

Figure 12:
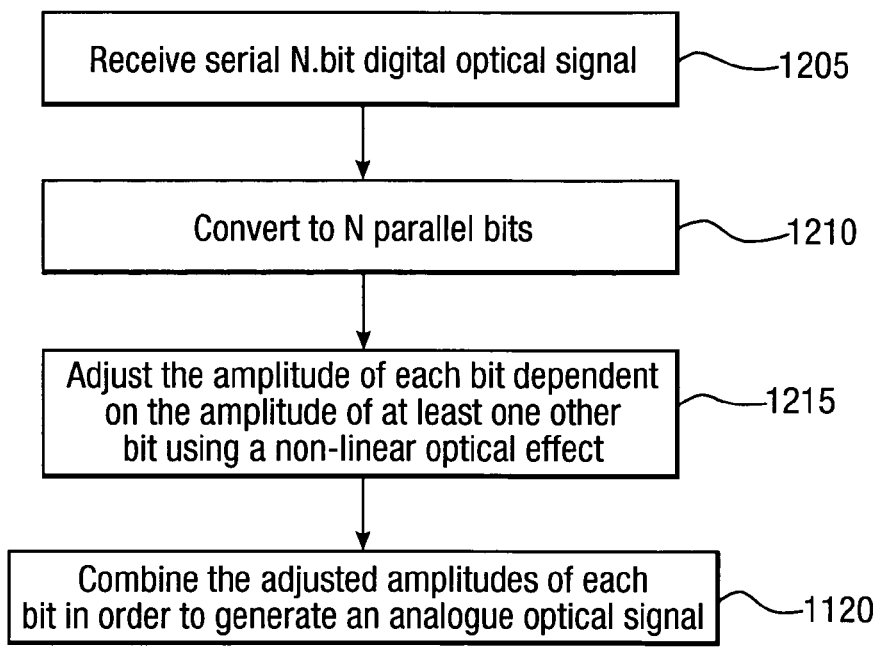
FIG. 12 is a method of converting an optical digital signal to an optical analogue signal.

A method of converting an optical digital signal to an optical analogue signal is shown in FIG. 12. This method 1200 may be implemented in the DAC 100 or 600 of the embodiments described above, or in another device. In a first step 1205, the method receives an N-bit digital optical signal; typically in serial format. The method, if required, converts the serial signal to a parallel digital optical signal at step 1210. At step 1215, the method adjusts the amplitude of each bit of the digital optical signal dependent on at least one of the other bits of the N-bit digital optical signal using a non-linear effect in order to generate an output associated with each received bit of the digital optical signal. This may be achieved by applying each optical bit to a respective non-linear optical device which has a gain controlled by the other bit(s). At step 1220, the outputs from each bit of the digital optical signal are combined in order to generate the analogue optical signal.

In practice the gates are arranged such that in order to avoid summation, only one of the gate outputs is non-zero for each analog level—the other gate output being suppressed using appropriate values of the gate components are previously described.

Figure 11:
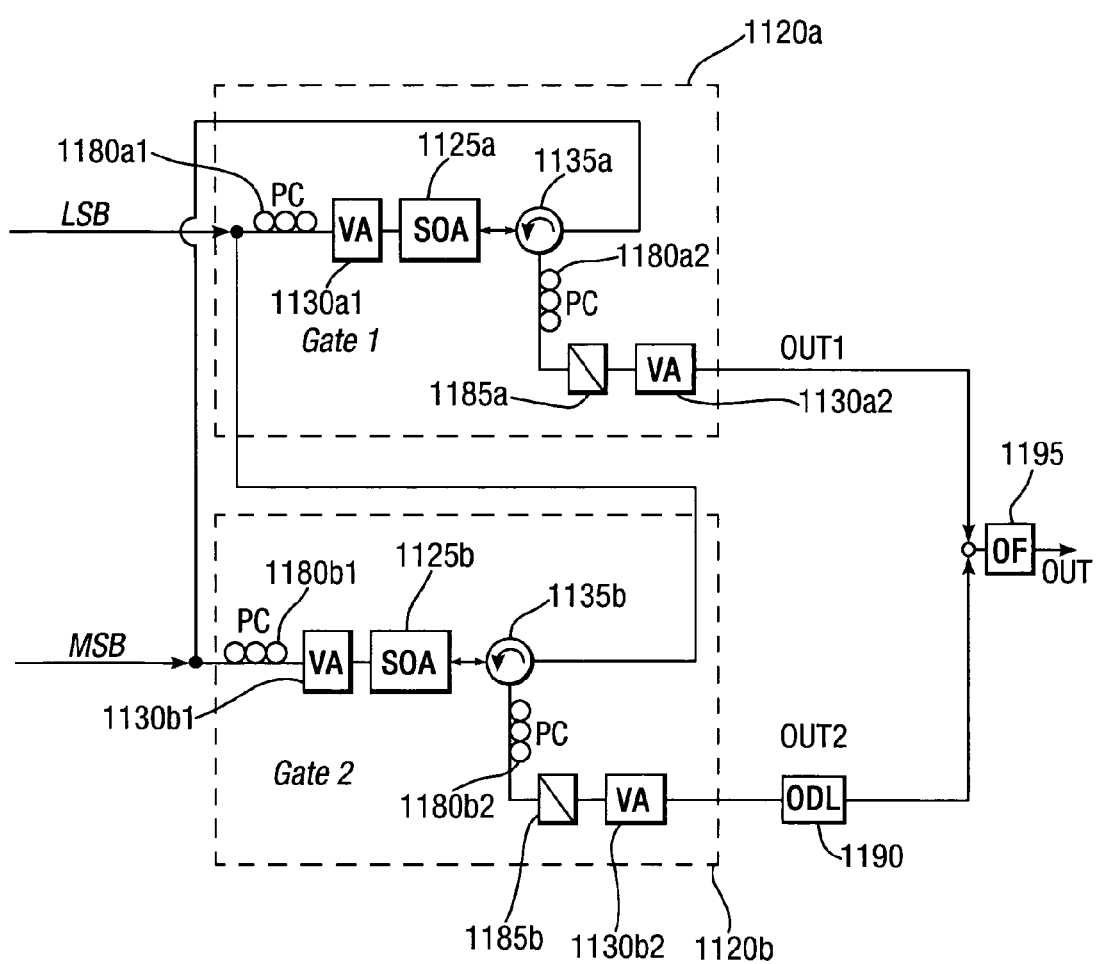
FIG. 11 is a schematic of a binary 2 bit embodiment.

A 2-bit binary DAC embodiment is illustrated in FIG. 11. This DAC 1100 converts a binary as opposed to grey coded digital optical signal to an analogue optical signal. This implementation is similar to that of FIG. 1, and the same components are referenced the same as FIG. 1. The first optical processing gate 1120a additionally comprises a first polarisation controller 1180a1 coupled between the signal input 1150a and the SOA 1125a; a second polarisation controller 1180a2 coupled between the output port of the optical circulator 1135a and the output 1160a of the first optical processing gate 1120a; and a polarizer 1185a coupled between the second polarisation controller 1180a2 and the output 1160a.

This embodiment exploits non-linear polarisation rotation of probe signals (LSB) inside the SOA dependent on the power of the pump signal (MSB). The polarization of the probe signal (LSB) may be rotated depending on the power level of the pump signal (MSB) before the probe signal is output to the polarizer 1185a, The output polarizer 1185a is used to select only one polarization state of the probe signal. The polarization controller 1180a1 is used to adjust polarization of the input probe signal (LSB) to be approximately 45° with respect to the polarization of the pump signal (MSB) inside the SOA 1125a, to maximize the nonlinear polarization rotation effect. The second polarization controller 1180a2 is used to adjust the polarization of the probe light at SOA output with the orientation of the polarizer axis. By changing the bias polarization state of the probe signal using the second polarization controller 1180a2 it is possible to have either probe light passing through the polarizer 1185a or probe light being stopped by the polarizer 1185a when the pump signal power is in the high state, which allows both normal (binary) and gray code implementation. The output signal from the polarizer 1185a may be fully transmitted, suppressed or partially attenuated depending on the orientation of the polarizer 1185a axis with respect to the bias polarization state of the probe signal. These parameters are configured in order to implement a binary or grey code embodiment.

The second optical processing gate 1120b is also similar to the corresponding gate 120b of FIG. 1, and additionally comprises two polarisation controllers 1180b1 and 1180b2 and a polarizer 1185b as shown.

The inputs and outputs of the DAC 1100 are shown in the table below:

| MSB | LSB | OUT1 | OUT2 | OUT$_{tot}$ |
|-----|-----|------|------|-------------|
| 0 | 0 | 0 | 0 | 0 (level 0) |
| 0 | 1 | P1 | 0 | P1 (level 1) |
| 1 | 0 | 0 | P2 | P2 (level 2) |
| 1 | 1 | 0 | P3 | P3 (level 3) |

In the first gate 1120a, where LSB=0, the output OUT1 is also 0, When LSB=1 and MSB=0, the probe signal (LSB) light with power P1 at the output the SOA 125a, has its polarization biased in such a way that it is largely unaffected by the polarizer 1185a and exits the polarizer 1185a with power P1. When LSB=1 and MSB=1, the pump (MSB) power is responsible for probe polarization rotation in such a way that the probe (LSB) power is completely blocked by the polarizer 1185a, The output power level is thus 0 for this case. For the second gate 1120b, the polarization of the input probe (MSB) at the output of the gate is biased by means of the polarisation controller 1180b2 in such a way that, in absence of the pump (LSB) pulse, the probe (MSB) is partially transmitted through the polarizer (with power P2). When the pump (LSB) is present, the probe (MSB) has its polarisation rotated in the SOA 125b, and is totally transmitted (output power P3>P2) through the polarizer 1185b.

In order to obtain the desired output levels for the gates, a high power level of the pump pulse is not required. The amount of power responsible for 90 degree polarization rotation in the SOA is usually lower than the power required to strongly compress the SOA gain. In this embodiment the control (pump) signal is used to produce polarization rotation effect for amplitude modulation of the output bit of each gate, rather than gain compression in the SOA. Variable attenuators 1130a2 and 1130b2 can be used at the output of the gates to readjust the output power levels to form the desired analog signal.

An optical delay line 1190 and an optical filter 1195 complete the circuit. The optical delay line is used for correct timing of the pulses coming from the two outputs before the output coupler. The optical filter removes the optical noise outside the bandwidth of the signal which is generated from the SOAs.

The invention claimed is:

1. A digital-to-analogue converter (DAC) arranged to receive an N-bit digital optical signal and to process the N-bit digital optical signal to generate an analogue optical signal, the converter comprising:
    means for adjusting the amplitude of each bit of the N-bit digital optical signal dependent on the amplitudes of the one or more other bits of the N-bit digital optical signal using a non-linear optical device in order to generate a number of predetermined output levels for the analogue optical signal, each output level of the analogue optical signal corresponding to a respective value of the N-bit digital optical signal;
    means for combining the output levels to generate the analogue optical signal.

2. A DAC according to claim 1, wherein the means for adjusting the amplitude of each bit is arranged to generate a non-zero output for only one of said bits.

3. A DAC according to claim 1, wherein the means for adjusting the amplitude of each bit of the N-bit digital optical signal comprises a first optical processing gate comprising:
    a signal input arranged to receive a first said bit of the N-bit digital optical signal and coupled to an input of a non-linear optical device;
    a control input arranged to receive a second said bit of the N-bit digital optical signal and which is arranged to control the gain of the non-linear optical device; and
    an output coupled to an output of the non-linear device and the means for combining the outputs for each bit.

4. A DAC according to claim 3, further comprising a second optical processing gate comprising:
    a signal input arranged to receive the second said bit of the N-bit digital optical signal and coupled to an input of a second non-linear optical device;
    a control input arranged to receive another bit of the N-bit digital optical signal and which is arranged to control the gain of the second non-linear optical device;
    an output coupled to an output of the second non-linear device.

5. A DAC according to claim 3, wherein each said optical processing gate further comprises at least one further control input arranged to receive another said bit of the N-bit digital optical signal and which is arranged to control the gain of at least one further non-linear optical device, the or each further non-linear optical device being coupled between another non-linear optical device and the output of the respective optical processing gate.

6. A DAC according to claim 3, wherein the means for combining the outputs for each said bit comprises an optical coupler coupled to the outputs of the optical processing gates.

7. A DAC according to claim 3, wherein each control input is coupled to the output of the respective non-linear optical device, and wherein each optical processing gate is arranged to pass the bits received from their respective signal and control inputs through the respective non-linear optical device substantially simultaneously.

8. A DAC according to claim 4, further comprising optical attenuators coupled between the non-linear device and the output of at least one said optical processing gates, and optical attenuators coupled between the output of the non-linear device and the control input of at least one of the optical processing gates, the optical attenuators arranged to suppress the output for every bit except one.

9. A DAC according to claim 4, further comprising an optical circulator coupled between the control input, the respective non-linear optical device, and the output of at least one of the optical processing gates.

10. A DAC according to claim 3, wherein the non-linear optical devices comprise semiconductor optical amplifiers (SOA).

11. A DAC according to claim 3, further comprising an optical serial-to-parallel converter arranged to receive the N-bit digital optical signal and output the bits of the N-bit digital signal from respective outputs which are coupled to respective inputs of the or each optical processing gate.

12. A DAC according to claim 3, further comprising polarisation controllers and a polarizer in each optical processing gate arranged to modify the correspondence between the output levels for the analogue optical signal and the values of the N-bit digital optical signal.

13. A method of converting an N-bit digital optical signal and to an analogue optical signal, method comprising:
adjusting the amplitude of each bit of the N-bit digital optical signal dependent on the amplitudes of the one or more other bits of the N-bit digital optical signal using a non-linear optical device in order to generate a number of predetermined output levels for the analogue optical signal, each output level of the analogue optical signal corresponding to a respective value of the N-bit digital optical signal;
combining the outputs levels to generate the analogue optical signal.

14. A method according to claim 13, wherein adjusting the amplitude of a first bit of the N-bit digital optical signal comprises applying the first bit to an input of a non-linear optical device and using a second bit of the N-bit digital optical signal to control the gain of the non-linear optical device.

15. A method according to claim 14, wherein the first bit is applied to a probe input of a semiconductor optical amplifier and the second bit is applied to a pump input of the semiconductor optical amplifier.

16. A method according to claim 13, wherein adjusting the amplitude of each bit comprises generating a non-zero output for only one of said bits.

* * * * *

UNITED STATES PATENT AND TRADEMARK OFFICE
CERTIFICATE OF CORRECTION

PATENT NO. : 8,842,028 B2
APPLICATION NO. : 13/201693
DATED : September 23, 2014
INVENTOR(S) : Porzi et al.

It is certified that error appears in the above-identified patent and that said Letters Patent is hereby corrected as shown below:

On the Title page, item (54), and in the Specification, in Column 1, Line 2, in Title, delete "CONVERSTION" and insert -- CONVERSION --, therefor.

In the Specification

In Column 2, Line 60, delete "gate 120b," and insert -- gate 120b. --, therefor.

In Column 2, Line 67, delete "attenuator 130a," and insert -- attenuator 130a. --, therefor.

In Column 3, Lines 5-6, delete "circulator 135a," and insert -- circulator 135a. --, therefor.

In Column 3, Lines 7-8, delete "input 155a," and insert -- input 155a. --, therefor.

In Column 3, Line 9, delete "gate 120a," and insert -- gate 120a. --, therefor.

In Column 3, Line 18, delete "circulator 135b," and insert -- circulator 135b. --, therefor.

In Column 3, Line 20, delete "gate 120b," and insert -- gate 120b. --, therefor.

In Column 3, Line 22, delete "gate 120b," and insert -- gate 120b. --, therefor.

In Column 3, Line 33, delete "or 125b," and insert -- or 125b. --, therefor.

In Column 3, Line 36, delete "or 155b," and insert -- or 155b. --, therefor

In Column 4, Line 1, delete "gate 120b," and insert -- gate 120b. --, therefor.

In Column 4, Line 12, delete "(MSB) 115b," and insert -- (MSB) 115b. --, therefor.

Signed and Sealed this
Fourth Day of August, 2015

Michelle K. Lee
*Director of the United States Patent and Trademark Office*

CERTIFICATE OF CORRECTION (continued)
U.S. Pat. No. 8,842,028 B2

In Column 5, Line 24, delete "and 120b," and insert -- and 120b. --, therefor.

In Column 6, Line 14, delete "level 1-tolevel0" and insert -- level1-to-level0 --, therefor.

In Column 6, Line 53, delete "gate 620d," and insert -- gate 620d. --, therefor.

In Column 6, Line 58, delete "Gate4 620d," and insert -- Gate4 620d. --, therefor.

In Column 6, Line 58, delete "Gate4 620d," and insert -- Gate4 620d. --, therefor.

In Column 10, Line 19, delete "#2=1," and insert -- #2=1. --, therefor.

In Column 10, Line 62, delete "polarizer 1185a," and insert -- polarizer 1185a. --, therefor.

In Column 11, Line 33, delete "also 0," and insert -- also 0. --, therefor.

In Column 11, Line 40, delete "polarizer 1185a," and insert -- polarizer 1185a. --, therefor.

In the Claims

In Column 14, Line 4, in Claim 13, delete "outputs" and insert -- output --, therefor.